(12) United States Patent
Teglia

(10) Patent No.: US 12,177,347 B2
(45) Date of Patent: Dec. 24, 2024

(54) METHOD FOR PERFORMING MUTUALIZED CALCULATIONS OF MULTIPLE CRYPTOGRAPHIC OPERATIONS

(71) Applicant: THALES DIS FRANCE SAS, Meudon (FR)

(72) Inventor: Yannick Teglia, Belcodene (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 17/766,758

(22) PCT Filed: Sep. 23, 2020

(86) PCT No.: PCT/EP2020/076550
§ 371 (c)(1),
(2) Date: Apr. 6, 2022

(87) PCT Pub. No.: WO2021/069214
PCT Pub. Date: Apr. 15, 2021

(65) Prior Publication Data
US 2024/0097900 A1    Mar. 21, 2024

(30) Foreign Application Priority Data

Oct. 10, 2019   (EP) .................................... 19306328

(51) Int. Cl.
*H04L 9/30* (2006.01)
(52) U.S. Cl.
CPC .................. *H04L 9/3066* (2013.01)

(58) Field of Classification Search
CPC ........ H04L 9/3066; H04L 9/3252; H04L 9/30
See application file for complete search history.

(56) References Cited

U.S. PATENT DOCUMENTS

| 7,702,105 | B1 | 4/2010 | Gura et al. | |
| 2004/0062391 | A1* | 4/2004 | Tsunoo | G06F 21/602 380/42 |
| 2020/0125085 | A1* | 4/2020 | Yun | H04W 4/40 |

OTHER PUBLICATIONS

International Search Report (PCT/ISA/210) and Written Opinion (PCT/ISA/237) mailed on Nov. 24, 2020, by the European Patent Office as the International Searching Authority for current International Application No. PCT/EP2020/076550—[14 pages].

(Continued)

*Primary Examiner* — Quazi Farooqui

(57) ABSTRACT

Provided is a method for performing a plurality of cryptographic operations, that upon reception of a request to perform one of said cryptographic operations, prevents an execution by said processing system of said requested cryptographic operation until a predetermined waiting time (G) has elapsed, and before said predetermined waiting time has elapsed, receives one or more requests to perform another cryptographic operation, and after said predetermined waiting time (G) has elapsed, answers (S3) said requests by executing operations comprising mutualized calculations. The method determines said waiting time depending on execution times of said cryptographic operations to be performed and of said mutualized calculations.

14 Claims, 2 Drawing Sheets

(56) References Cited

OTHER PUBLICATIONS

Chen Chien-Ning: "Multi-Exponentiation Algorithm", Feb. 15, 2012 (Feb. 15, 2012), XP055677566, Retrieved from the Internet: URL:http://www1.spms.ntu.edu.sg/-ccrg/documents/chienning-multiexponentiation.pdf [retrieved on Mar. 18, 2020] slide 2 and 4.
Balasubramaniam et al: "Fast simultaneous scalar multiplication", Applied Mathematics and Computation, Elsevier, US, vol. 192, No. 2, Sep. 15, 2007 (Sep. 15, 2007), pp. 399-404, XP022266889, ISSN: 0096-3003, DOI: 10.1016/J.AMC.2007.03.017 section 3.
Pradeepkumar Mishra et al: "Application of Montgomery's Trick to Scalar Multiplication for Elliptic and Hyperelliptic Curves Using a Fixed Base Point", Feb. 26, 2004 (Feb. 26, 2004), Public Key Cryptography—PKC 2004; [Lecture Notes in Computer Science;;[NCS], Springer-Verlag, Berlin/Heidelberg, pp. 41-54, XP019002856, ISBN: 978-3-540-21018-4—section 2.2.

* cited by examiner

Fig. 1
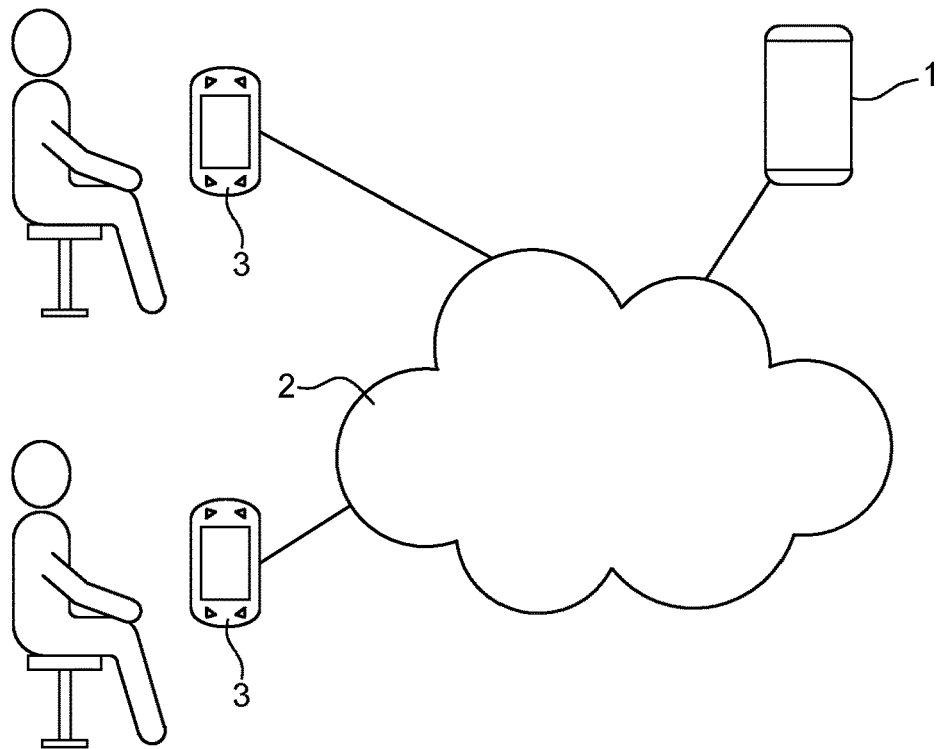
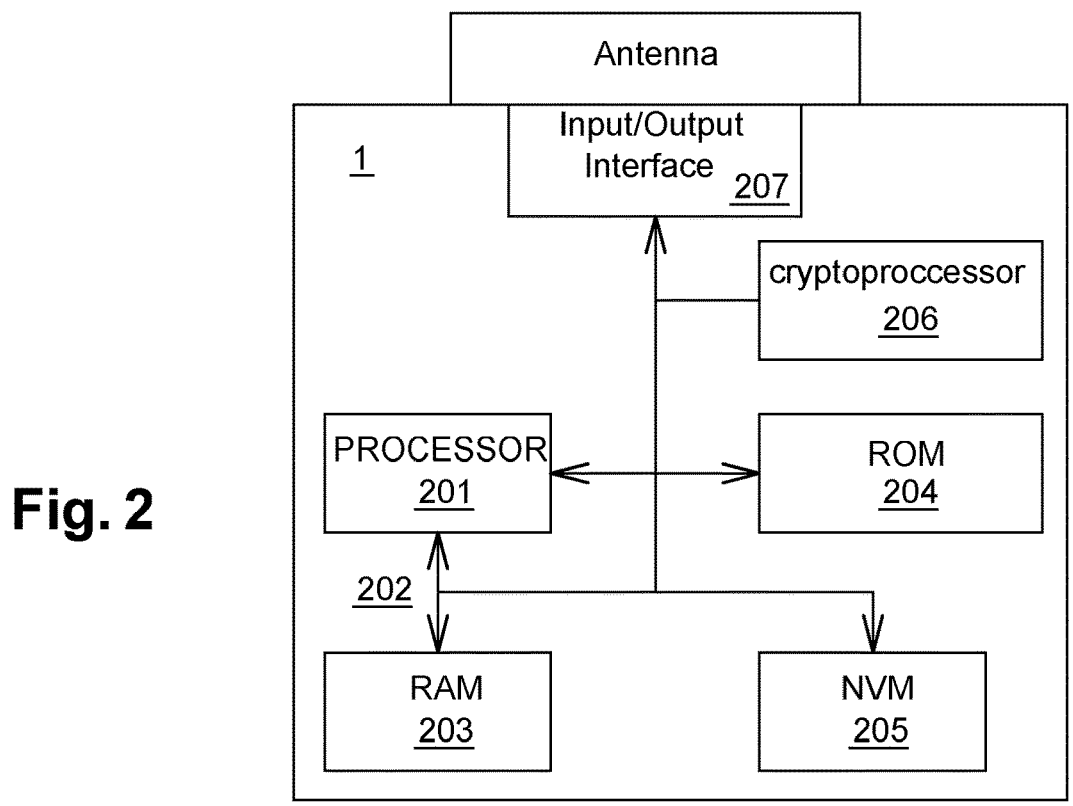
Fig. 2

METHOD FOR PERFORMING MUTUALIZED CALCULATIONS OF MULTIPLE CRYPTOGRAPHIC OPERATIONS

FIELD OF THE INVENTION

The present invention relates to the field of cryptographic computations and more particularly to a method decreasing the resource consumption of cryptographic computations by performing mutualized calculations of multiple cryptographic operations.

BACKGROUND OF THE INVENTION

Despite the constant progresses of modern CPUs and cryptographic coprocessors, cryptographic computations remain computation intensive tasks. Such tasks may exceed the computational power of a system in charge of performing these calculations, particularly when several processes or devices may order such calculations at the same time and repeatedly.

In such a case, the operating system of the system has to perform a scheduling of the requested tasks. It may dispatch the execution of a single task over multiple short timeslots, which enables not to wait the end of a tasks before starting another one. Nevertheless, such a scheduling has the drawback of increasing the global CPU time of each task, because of the overhead caused by context saving/restoring operations performed at the end of each execution time slot.

In the end, when a very large number of requests for cryptographic operations have to be handheld in parallel, such a system may either have to reject part of these requests or it may perform all the requested tasks concurrently at the cost of a very important increase of the execution time of each task.

Consequently, there is a need for a method for performing a plurality of cryptographic operations which enables to perform these operations in parallel on a single CPU or coprocessor while minimizing the execution time of these operations.

SUMMARY OF THE INVENTION

For this purpose and according to a first aspect, this invention therefore relates to a method for performing a plurality of cryptographic operations comprising, performed by a processing system:
- upon reception of a request to perform one of said cryptographic operations, preventing the execution by said processing system of said requested cryptographic operation until a predetermined waiting time has elapsed,
- before said predetermined waiting time has elapsed, receiving one or more requests to perform another cryptographic operation,
- after said predetermined waiting time has elapsed, answering said requests by executing operations comprising mutualized calculations, wherein said method also comprises a step of determining said waiting time depending on execution times of said cryptographic operations to be performed and of said mutualized calculations.

Such a method enables to save resources thanks to the single execution of the mutualized calculations, while enabling to collect requests needed to perform such mutualized calculations.

In a first embodiment, said requests are transmitted by a single requesting process or entity and:
- one of said requested cryptographic operation is a combination of a plurality of said requested cryptographic operations,
- answering said requests comprises computing, and transmitting to said requesting process or entity, the result of said combination by performing said mutualized calculations.

Such a method enables to save time by avoiding the calculation of all the operands of the combination operation.

In a second embodiment, said requests are transmitted by multiple requesting processes or entities and wherein answering said requests comprises:
- executing said mutualized calculations,
- computing the results of each of said requested cryptographic operations using the results of said executed mutualized calculations, and
- transmitting to each requesting process or entity the results of the cryptographic operations it requested.

Such a method enables to reduce the global execution time of all the requested cryptographic operations by executing the mutualized calculations only once, whereas they may have to be executed once for each requested operations when performing such operations sequentially.

Said waiting time G may be determined such that $G<k*T_u-T_m$ with $T_u$ the time for performing a cryptographic operation when it is performed one at a time, $T_m$ the time for executing said cryptographic operations comprising mutualized calculations and executed for answering said requests, and k the number of mutualized cryptographic operations.

Such a waiting time ensures to have a decrease of the global time needed for answering all the requests despite the force idle state maintained during the waiting time.

Said waiting time G may be determined dynamically using a waiting time probability function determined from requests history.

Such a waiting time probability function may depend on characteristics among a number of requests received in a predetermined time window and a frequency of requests.

It enables to set the waiting time at a value that seems to be the most efficient taking into account the mean pace at which requests are received by the processing system.

The result of said combination by performing said mutualized calculations may comprise performing a Strauss Shamir trick process.

Said steps of the method according to a first aspect may be performed by an Operating system or a cryptographic driver.

Said cryptographic operations may be public key cryptographic operations among encryption, decryption, signature generation and signature verification.

Said cryptographic operations may be among modular operations comprising modular multiplications, modular exponentiations, modular inverses and operations based on elliptic curve cryptography comprising additions and scalar multiplications of points of an Elliptic Curve.

According to a second aspect, this invention therefore relates also to a computer program product directly loadable into the memory of at least one computer, comprising software code instructions for performing the steps of the methods according to the first aspect when said product is run on the computer.

According to a third aspect, this invention therefore relates also to a processing system comprising a memory, an interface and a processor able to execute resources configured to perform the steps of the method according to the first aspect.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

FIG. 1 is a schematic illustration of a system comprising a processing system according to an embodiment of the present invention;

FIG. 2 is a schematic illustration of a processing system according to an embodiment of the present invention;

DETAILED DESCRIPTION OF EMBODIMENTS OF THE INVENTION

Figure 3:
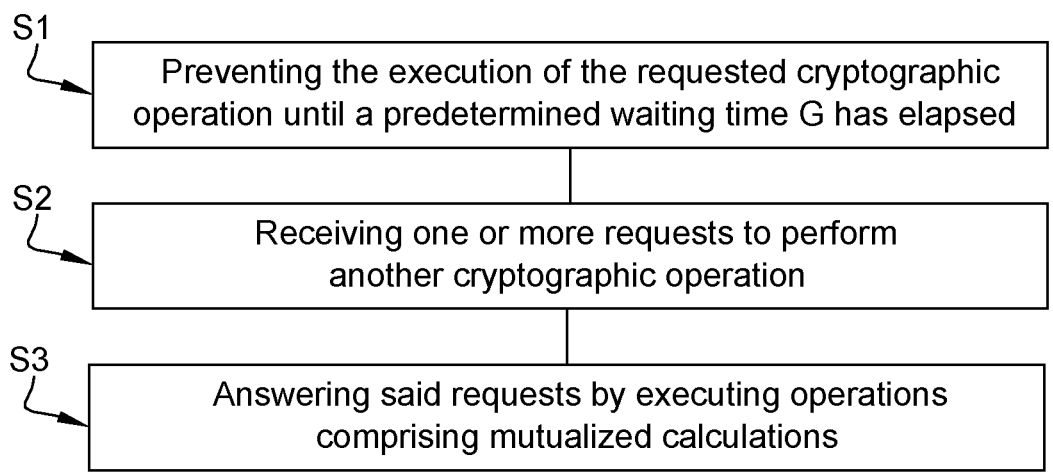
FIG. 3 illustrates schematically a method for performing a plurality of cryptographic operations according to an embodiment of the present invention.

The invention aims at minimizing the execution time of cryptographic operations performed by a processing system in order to enable such a system to use more efficiently its computing resources, to answer more requests simultaneously and to decrease the risk of having a load of the system exceeding its capacity.

In order to do so, the invention aims at taking advantage of the similarity that exist between cryptographic operations. Indeed, most of such operations belong to a few types of operations among encryption and decryption, signing and verifying. And such types of operations often rely on the same kind of elementary operations: exponentiation, inversion, scalar multiplication of a point of an elliptic curve . . . .

Algorithms have been proposed that save execution time by performing such operations in parallel and by taking advantages of synergies between these operations performed concurrently rather than executing these operations sequentially, one at a time.

For example, two cryptographic operations may be decomposed into elementary calculations (additions, multiplications . . . ) and may have one or more elementary calculations in common. In such a case performing both cryptographic operations only requires a single execution of such shared elementary calculations whereas they would be executed twice if the two cryptographic operations were executed sequentially.

In another example two cryptographic operations, for example computing $x_1^a$ and $x_2^b$, may be requested by a single device and the same device may then request another operation using as operands the results of the two previous operations, for example $x_1^a * x_2^b$. In such a case Shamir trick (ElGamal, T. A public-key cryptosystem and a signature scheme based on discrete logarithms, IEEE Transactions on Information Theory 31 (1985), 469{472.) may be used to compute the result of the last operation $x_1^a * x_2^b$ without computing the results of the two first operations, and at a lower cost.

In the following paragraphs, such calculations, enabling to get the same final result while saving execution time compared to a sequential execution of multiple cryptographic operations, are called "mutualized calculations".

An issue, faced when implementing such algorithms in a cryptographic device in order to perform a plurality of cryptographic operations at a lower cost by executing mutualized calculations, is that the mutualized calculations to be performed depend on all these cryptographic operations which are not necessarily requested at the same time by requesting devices and processes. This may result in an additional waiting time which may exceed the time saved thanks to the mutualized calculations. For example, in the case of performing two cryptographic operations using mutualized calculations, the execution of the mutualized calculations does not start until the two cryptographic operations are requested. In such a case, the execution time of the first received requested cryptographic operation is lengthened by the time between the request of the first operation and the request of the second operation. When such a time is long, the global execution time of the two operations may even become longer than the time required to execute both sequentially.

In such a context, the invention provides a method for performing a plurality of cryptographic operations using mutualized calculations which ensures saving time despite the fact that these cryptographic operations are not requested at the same time. Such cryptographic operations may for example be public key cryptographic operations among encryption, decryption, signature generation and signature verification. They may also be among modular operations, for example based on Galois fields, comprising modular multiplications, modular exponentiations, modular inverses and operations based on elliptic curve cryptography comprising additions and scalar multiplications of points of an Elliptic Curve.

In order to do so, the method of the invention comprises several steps described hereafter and performed by a processing system 1. Such a processing system may for example be a smart chip, a mobile telephone, a tablet, or a personal computer.

The cryptographic operations performed by the processing system may be requested by processes executed by the processing system itself. Alternatively, or in addition, as shown on FIG. 1, the processing system may be connected through a network 2, to one or more requesting devices 3 sending cryptographic operations requests to the processing system.

FIG. 2 is a schematic illustration of the processing system. The processing system may include a processor 201 connected via a bus 202 to a random access memory (RAM) 203, a read-only memory (ROM) 204, and/or a non-volatile memory (NVM) 205. The client device further includes a connector connected to the processor and by which the client device may be connected to an antenna. Such an antenna may be used to connect the client device to various forms of wireless networks, e.g., wide-area networks, WiFi networks, or mobile telephony networks, including the network 2. Alternatively, the client device may connect to networks via wired network connections such as Ethernet.

The cryptographic computations performed by the processing system 1 may be performed by software resources executed by the processing system, such as the operating system of the processing system or a cryptographic driver. Alternatively, the processing system may include hardware means dedicated to cryptographic computations 206, such as a cryptographic coprocessor, and the cryptographic computations performed by the processing system may be executed by such dedicated hardware means.

The client device may also include an input/output interface 207 providing interfaces to the user of the client device, such as one or more screens, loudspeakers, a mouse, tactile surfaces, a keyboard etc. . . . . .

The following paragraphs describe the steps performed by the processing system for performing a plurality of cryptographic operations as illustrated on FIG. 3.

In a first step S1, triggered upon reception of a request to perform one of said cryptographic operations, the processing system prevents the execution by said processing system of said requested cryptographic operation until a predetermined waiting time G has elapsed. At this step, the processing system stops itself from performing the requested cryptographic operation in order to have a chance to receive a request for at least another cryptographic operation such that both requests may be answered using mutualized calculations at a lower cost the cost of a sequential execution of both requested cryptographic operations. The processing system will remain in this waiting state during the waiting time G before starting the execution of calculations for answering one or more of the requests received during the waiting time.

In a second step S2, which lasts until said predetermined waiting time has elapsed, the processing system receives one or more requests to perform another cryptographic operation. In order to execute mutualized calculations, at least two requests, including the one received at the first step, shall be received. The processing system may also receive more than two requests and then execute mutualized calculations that are useful to answer these multiple requests.

In a third step S3, after said predetermined waiting time G has elapsed, the processing system answers said requests by executing operations comprising mutualized calculations. The answers to the requests may either be the direct result of the mutualized calculations or may be obtained from the result of the mutualized calculations.

The waiting time G has to be set carefully in order to ensure that the global execution time of all the calculations to be executed for answering the received requests is lower than the calculation time obtained in case of a sequential execution of the requested cryptographic operation. The processing system determines said waiting time G depending on execution times of said cryptographic operations to be performed and of said mutualized calculations.

The value of the waiting time G may be such that $G<k*T_u-T_m$ with:
- $T_u$ the time for performing a cryptographic operation when it is performed one at a time, independently from the other,
- $T_m$ the time for executing said cryptographic operations comprising mutualized calculations and executed for answering said requests, and
- k the number of mutualized cryptographic operations.

Such a value of the waiting time G indeed ensures to decrease the global execution time of the requested operations.

The waiting time G may be dynamically determined using a waiting time probability function. Such a probability function may be determined from requests history. For example it may depend on a number of requests received in a predetermined time window and a frequency of requests. Such information may be acquired by the Operating System of the processing system during a learning step wherein the Operating System monitors the transmissions of requests. Such information may be acquired separately for each requesting process.

In a first embodiment, the requests to perform a plurality of cryptographic operations to be answered using the same mutualized calculations are transmitted by a single requesting process or entity and one of said requested cryptographic operation is a combination of a plurality of said requested cryptographic operations. For example one of said cryptographic operations is an addition or multiplication of the results of the other requested cryptographic operations. The only result that is really sought by the requesting entity is then the result of the combination operation and the intent of the other requested operations is only to get the operands of the combination operation and such operands are not interesting in themselves.

In such a case it may be interesting to compute the combination operation using an algorithm that does not rely on a previous calculation of the operands of the combination, when such an algorithm exists. Therefore the third step S3 may comprise, in order to answer the requests, computing and transmitting to said requesting process or entity, the result of said combination by performing said mutualized calculations.

As an example, computing the result of the combination by performing mutualized calculations may comprise performing a Strauss Shamir trick process, already introduce here above. Such a process enables to compute a product of multiple exponentiations $g_0^{e0} g_1^{e1} \ldots g_{k-1}^{ek-1}$ with $g_0, g_1 \ldots$ group elements and $e_0, e_1 \ldots$ non negative t-bit integers by performing the following steps as described in 14.88 in A. Menezes, P. van Oorschot, and S. Vanstone, Handbook of Applied Cryptography, New York, 1996.:

For i from 0 to $(2^k-1)$, computing $\text{prod}_{j=0 \text{ to } k-1} g_j^{ij}$ where $i=(i_{k-1} \ldots i_0)_2$ A being initialized at 1, for i from 1 to t, $A \leftarrow A \cdot A$, $A \leftarrow A \cdot G_{I_i}$.

Return A.

Using such a process, the combination of exponentiations $g_0^{e0} g_1^{e1} \ldots g_{k-1}^{ek-i}$ may be obtained by performing only t−1 squarings and at most $(2^k-2)+t-1$ multiplications, which is lower than the calculation based on the sequential computation of k exponentiations which would cost $k*(t-1)$ squarings and $k*t+t-1$ multiplications.

In a second embodiment, the requests to perform a plurality of cryptographic operations to be answered using the same mutualized calculations are transmitted by multiple requesting processes or entities. In such a case, contrarily to the previous embodiment, each requesting process or entity waits for an answer to its request and the results of all requested cryptographic operations have to be computed. In such a case answering said requests at the third step S3 comprises:
- executing the mutualized calculations,
- computing the results of each of said requested cryptographic operations using the results of the executed mutualized calculations, and
- transmitting to each requesting process or entity the results of the cryptographic operations it requested.

In a first example, the requested cryptographic operations are inverse operations $1/x_1 \ldots 1/x_n$. In such a case, a mutualized calculation may be the calculation of the inverse $1/x_1 * \ldots * x_n$. And then each inverse $1/x_i$ may be obtained by multiplying the result of the mutualized calculation $1/x_1 * \ldots * x_n$ by Product $x_j$ with j different de i. In this example n inversions are replaced by only one inversion and $n*(n-1)$ multiplications.

In a second example, mutualized calculations may be used to compute multiple scalar multiplications of a single point P on an elliptic curve. An algorithm for computing such a scalar multiplication may be:

```
Scalar_mult(k₁,k₂,P) return R₁,R₂:
    T₁:=0
    T₂:=0
    For i in range(0..n-1)
        if(k₁[i]==1)
            T₁:=T₁+P
        if(k₂[i]==1)
            T₂:=T₂+P
        Endif
        P :=2.P
    Endfor
    Return R₁,R₂:=T₁,T₂
```

The "square" step P=2P does not depend on the scalar with which the elliptic point is multiplied. As a result, such a calculation may be mutualized for the calculation of n scalar multiplication of the same point P: $k_1 P$, $k_2 P$ .... In such a case, only t squarings are required, with t the binary length of the scalars $k_1$ ... instead of n*t squarings.

According to a second aspect, the invention is also related to a computer program product directly loadable into the memory of at least one computer, comprising software code instructions for performing the steps of the method described here before when said product is run on the computer.

As a result, the proposed method and system enable to mutualize part of the calculations required to answer a plurality of requests for cryptographic operations and therefore minimize the execution time of these operations, while taking into account the fact that the requests to be answered using mutualized calculations are not received simultaneously.

The invention claimed is:

1. A method for performing a plurality of cryptographic operations comprising, performed by a processing system:
   upon reception of a request to perform one of said cryptographic operations, preventing an execution by said processing system of said requested cryptographic operation until a predetermined waiting time has elapsed;
   before said predetermined waiting time has elapsed, receiving one or more requests to perform another cryptographic operation;
   after said predetermined waiting time has elapsed, answering said requests by executing operations comprising mutualized calculations at a lower cost than a sequential execution of said cryptographic operations; and
   determining said predetermined waiting time depending on execution times of said cryptographic operations to be performed and of said mutualized calculations.

2. The method of claim 1, wherein said requests are transmitted by a single requesting process or entity and wherein:
   one of said requested cryptographic operation is a combination of a plurality of said requested cryptographic operations,
   answering said requests comprises computing, and transmitting to said requesting process or entity, the result of said combination by performing said mutualized calculations.

3. The method of claim 2, wherein computing the result of said combination by performing said mutualized calculations comprises performing a Strauss Shamir trick process.

4. The method of claim 3, wherein the result of said combination is a product of k exponentiations $g_0 e0 g1^{e1}$ ... $Q_{k-1} ek-1$ with $g_0, g_1$ ... group elements and $e_0, e_1$ ... non negative t-bit integers is obtained by performing only t−1 squarings and at most $(2^k-2)+t^{-1}$ multiplications and said cost is lower than a calculation based on a sequential computation of k exponentiations which cost k*(t−1) squarings and $k*t+t^{-1}$ multiplications.

5. The method of claim 1, wherein said requests are transmitted by multiple requesting processes or entities and wherein answering said requests comprises:
   executing said mutualized calculations,
   computing the results of each of said requested cryptographic operations using the results of said executed mutualized calculations, and
   transmitting to each requesting process or entity the results of the cryptographic operations it requested.

6. The method according to claim 5, wherein said predetermined waiting time G is determined such that G<k*Tu−Tm with Tu the time for performing a cryptographic operation when it is performed one at a time, Tm the time for executing said cryptographic operations comprising mutualized calculations and executed for answering said requests, and k the number of mutualized cryptographic operations.

7. The method according to claim 6, wherein said predetermined waiting time G is determined dynamically using a waiting time probability function determined from requests history.

8. The method of claim 7, wherein said predetermined waiting time probability function depends on characteristics among a number of requests received in a predetermined time window and a frequency of requests.

9. The method according to claim 8, wherein said cryptographic operations are public key cryptographic operations among encryption, decryption, signature generation and signature verification.

10. The method according to claim 9, wherein said cryptographic operations are among modular operations comprising modular multiplications, modular exponentiations, modular inverses and operations based on elliptic curve cryptography comprising additions and scalar multiplications of points of an Elliptic Curve.

11. The method according to claim 8, wherein said steps are performed by an Operating system or a cryptographic driver.

12. A computer program product directly loadable into a memory of a computer, comprising software code instructions that run on the computer and configure a processing system in the computer to perform a plurality of cryptographic operations by:
   preventing, upon reception of a request to perform one of said cryptographic operations, an execution by said processing system of a requested cryptographic operation until a predetermined waiting time has elapsed;
   receiving, before said predetermined waiting time has elapsed, one or more requests to perform another cryptographic operation;
   answering, after said predetermined waiting time has elapsed, said requests by executing operations comprising mutualized calculations at a lower cost than a sequential execution of said cryptographic operations; and
   determining said predetermined waiting time depending on execution times of said cryptographic operations to be performed and of said mutualized calculations.

13. A processing system comprising a memory, an interface and a processor to execute resources, wherein the system is configured to
- prevent, upon reception of a request to perform one of said cryptographic operations, an execution by said processor of a requested cryptographic operation until a predetermined waiting time has elapsed;
- receive, before said predetermined waiting time has elapsed, one or more requests to perform another cryptographic operation;
- answer, after said predetermined waiting time has elapsed, said requests by executing operations comprising mutualized calculations at a lower cost than a sequential execution of said cryptographic operations; and
- determine said predetermined waiting time depending on execution times of said cryptographic operations to be performed and of said mutualized calculations.

14. The processing system of claim 13, wherein the predetermined waiting time is dynamically determined using a waiting time probability function determined from requests history, and depending on a number of requests received in a predetermined time window and a frequency of requests acquired by an Operating System of the processing system during a learning step wherein the Operating System monitors transmissions of requests.

* * * * *